United States Patent
Koetz (10) Patent No.: US 10,873,995 B2
(45) Date of Patent: Dec. 22, 2020

(54) SYSTEM FOR PREPARING AT LEAST ONE FOOD PRODUCT

(71) Applicant: Vorwerk & Co. Interholding GmbH, Wuppertal (DE)

(72) Inventor: Hendrik Koetz, Wetter (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 218 days.

(21) Appl. No.: 15/920,108

(22) Filed: Mar. 13, 2018

(65) Prior Publication Data
US 2018/0270915 A1  Sep. 20, 2018

(30) Foreign Application Priority Data

Mar. 14, 2017 (DE) .......................... 10 2017 105 320

(51) Int. Cl.
*H05B 6/64* (2006.01)
*H05B 6/72* (2006.01)
(Continued)

(52) U.S. Cl.
CPC .............. *H05B 6/647* (2013.01); *A23L 5/15* (2016.08); *A47J 37/0629* (2013.01);
(Continued)

(58) Field of Classification Search
CPC .......... H05B 6/647; H05B 6/705; H05B 6/72; H05B 6/725; H05B 2206/04; A23L 5/15
(Continued)

(56) References Cited

U.S. PATENT DOCUMENTS

| 4,431,888 A * | 2/1984 | Simpson ................ H05B 6/725 219/746 |
| 2011/0033584 A1* | 2/2011 | Bilchinsky ............. H05B 6/705 426/129 |

(Continued)

FOREIGN PATENT DOCUMENTS

| CN | 101473692 A | 7/2009 |
| CN | 101903705 A | 12/2010 |

(Continued)

OTHER PUBLICATIONS

Notification of the Office Action for Taiwan Application No. 107108354 dated Jan. 8, 2019, with its English translation, 18 pages.
(Continued)

*Primary Examiner* — Thien S Tran
(74) *Attorney, Agent, or Firm* — Rudy J. Ng; Bret E. Field; Bozicevic, Field & Francis LLP (57) ABSTRACT

The invention relates to a system (100) for preparing at least one food product (1), comprising:
  a cooking chamber (10), in which at least one preparation area (5) is provided, wherein the at least one food product (1) can be positioned and prepared at the least one preparation area (5),
  at least one antenna arrangement (30) for supplying energy of electromagnetic energy (80) into the cooking chamber (10), whereby the at least one food product (1) can be heated,
  one transmission device (40) for operating the antenna arrangement (30), wherein at least one antenna (31) of the antenna arrangement (30) is oriented depending on the preparation area (5) and is operable according to at least one operation mode by the transmission device
(Continued)

(40), so that a performance-optimized temperature zone distribution for heating the food product (1) can be generated.

21 Claims, 2 Drawing Sheets

(51) Int. Cl.
    *H05B 6/70* (2006.01)
    *A23L 5/10* (2016.01)
    *A47J 37/06* (2006.01)

(52) U.S. Cl.
    CPC ............... *H05B 6/705* (2013.01); *H05B 6/72* (2013.01); *H05B 6/725* (2013.01); *A23V 2002/00* (2013.01); *H05B 2206/04* (2013.01); *Y02B 40/00* (2013.01)

(58) Field of Classification Search
    USPC .................. 219/681, 682, 690, 704, 756
    See application file for complete search history.

(56) References Cited

U.S. PATENT DOCUMENTS

| | | | | |
|---|---|---|---|---|
| 2011/0198344 | A1* | 8/2011 | Uchiyama | H05B 6/6408 |
| | | | | 219/680 |
| 2012/0312801 | A1* | 12/2012 | Bilchinsky | H05B 6/705 |
| | | | | 219/438 |
| 2016/0095171 | A1* | 3/2016 | Chaimov | H05B 6/6452 |
| | | | | 219/704 |
| 2016/0309548 | A1* | 10/2016 | Libman | H05B 6/6435 |

FOREIGN PATENT DOCUMENTS

| | | |
|---|---|---|
| EP | 2051563 A1 | 4/2009 |
| EP | 2233838 A1 | 9/2010 |
| JP | 2012-237507 A | 12/2012 |
| WO | WO2008084668 A1 | 7/2008 |

OTHER PUBLICATIONS

Examination Report for Australian Application No. 2018201838 dated Aug. 5, 2019, 3 pages.

* cited by examiner

SYSTEM FOR PREPARING AT LEAST ONE FOOD PRODUCT

The present invention relates to a system for preparing at least one food product according to the independent device claim. Furthermore, the invention relates to a method for preparing at least one food product according to the independent method claim.

Different systems for preparing food products are known from the prior art. Baking ovens, for example, heat the cooking product usually with a metal heating coil which is flown-through by current and thus can radiate heat. In contrast, microwave ovens use a magnetron for generating high-frequency electromagnetic radiation, which penetrates the cooking product and sets the atomic dipoles contained in the cooking product into rotation. Through the rotation, the kinetic energy of the water in the cooking product and thus the temperature of the cooking product can increase.

Here, it is a disadvantage that often only a static energy distribution or temperature distribution can be generated. Thus, for example a conventional microwave uses the magnetron to radiate electromagnetic energy. This electromagnetic energy, in particular at least one electromagnetic wave, has a static frequency and a static phase, whereby strongly varying temperature zones within the cooking chamber develop. To nevertheless heat the cooking product as uniformly as possible, a rotary plate is often used here to thus distribute the generated static energy distribution in the cooking product. Due to the reflective properties of the cavity, i.e. the cooking chamber, and the relatively great distances that the electromagnetic waves have to overcome from the magnetron to the cooking product, relatively high losses in performance occur, in particular in the course of the distribution by scattering and/or reflection and/or absorption of the waves. The field distribution of the electromagnetic waves in the cooking chamber can only insufficiently be adjusted which results in a non-uniform temperature distribution in the cooking chamber and/or in the cooking product and thus an energy loss and insufficient cooking results.

In particular in the baking oven, the metal heating element is attached below the ceiling element in the cooking chamber, whereas the cooking product is located usually above the base element. Thus, the heat radiation has to deal with a relatively great distance to the cooking product. Accordingly, a great volume is heated, which is not filled by the cooking product, so that energy losses and an insufficient preparation occur as well.

A further disadvantage is that different food products are heated at different speeds so that the preparation can not be effected satisfactory here as well, as partially an over-heating and partially an insufficient warming in the cooking product can occur.

Therefore, it is in particular an object of the present invention to at least partially remedy the above-described disadvantages. In particular, it is an object of the present invention to be able to heat food products, i.e. in particular cooking products, more uniformly and/or with lesser performance losses. Preferably, it is an object that certain areas in the cooking chamber (i.e. the cavity) can be heated in varying degrees or individually, if this is desired, and thus hotspots in the cooking chamber can be generated.

The above object is achieved through a system with the features of the independent claim and through a method with the features of claim 13. Further features and details of the invention result from the respective dependent claims, the description and the drawings. Here, features and details which are described in conjunction with the system according to the invention are of course also apply in conjunction with the method according to the invention and vice versa, so that reference is or can always be made reciprocally to the individual aspects of the invention with respect to the disclosure.

The object is in particular achieved through a system for preparing at least one food product (the cooking product/ product to be heated is meant), in particular for heating the at least one food product.

Preferably, the system according to the invention includes at least:
 a cooking chamber, in which at least one preparation area is provided, wherein in particular at the preparation area, the food product can be positioned and/or prepared, in particular heated and/or cooked, and
 at least one antenna arrangement for supplying energy, in particular by radiation, of electromagnetic energy into the cooking chamber, in particular to the at least one preparation area, whereby the food product can be heated and/or cooked and/or prepared, in particular for the preparation, and/or
 at least one transmission device for operating the antenna arrangement.

Here, it is in particular provided that at least one antenna of the antenna arrangement is oriented depending on the at least one preparation area and is operable according to at least one operation mode through the at least one transmission device, so that preferably a (in particular performance-optimized) temperature zone distribution can be generated, in particular in the cooking chamber and/or in the cooking product and/or at the preparation area, for heating and/or preparing the at least one food product, so that preferably performance losses can be reduced. This has the advantage that energy saving is possible, and that in particular the preparation of the food product can particularly simply be adjusted and optimized. The orientation of the antenna depending on the preparation area is effected in particular in that the antenna is fastened and/or oriented in such a way that the radiation of the electromagnetic energy through the antenna is effected in a certain direction, in particular in the direction of the preparation area, and/or is concentrated thereon.

In particular, it can be possible that through
 a change of the orientation of the at least one antenna and/or
 a change in the operation mode for the antenna arrangement or for the at least one antenna
at least one (in particular predetermined and/or adjusted) energy distribution, in particular temperature (zone) distribution, in particular in the cooking chamber and/or in the cooking product (i.e. the food product to be heated) can be generated. The orientation can e.g. be changed in that the at least one antenna, in particular the individual antennas, in each case distinctly, is moved and/or oriented (e.g. to a hotspot). Alternatively or in addition, the antenna or at least one of the antennas and/or each of the antennas can be configured immoveable so that no change in orientation is possible. Further, it is possible that the change of the operation mode is e.g. produced in that a performance and/or frequency and/or phase for operating the at least one antenna or distinctly for each antenna is adjusted. As a result, the temperature distribution can be adjusted so that different temperature distributions can be generated.

Possible energy distributions or temperature distributions (i.e. in particular temperature zone distributions), which can be generated in particular in the cooking chamber and/or in the cooking product and/or at the preparation area through use of the antenna arrangement, are, for example:
- a homogeneous energy distribution or temperature (zone) distribution, so that neighboring areas can be heated substantially uniformly,
- an inhomogeneous energy distribution or temperature (zone) distribution, so that neighboring areas can be heated strongly varying, and in particular hotspots can develop.

In particular, the energy distribution or temperature (zone) distribution is dynamic and can, in contrast to a static energy distribution or temperature (zone) distribution, be changed during the operation of the system according to the invention. Here, the temperature distribution correlates in particular with the (energy) distribution of the energy supplied by the antenna arrangement and in particular transmitted energy, in particular radiation, so that through an adjustment of this energy distribution, the desired temperature distribution can be generated, preferably depending on or considering the at least one food product to be heated in the cooking chamber. To that end, e.g. also further information, in particular about the food product and/or the temperature in the cooking chamber and/or cooking product, can be used for example via a user input and/or via a measurement, such as a temperature measurement.

A performance-optimized temperature zone distribution particularly means that a temperature zone distribution and/or energy zone distribution is generated, which is adjusted to the at least one food product and/or to the preparation area. Here, preferably the performance-optimized temperature zone distribution, in particular during operation of the system according to the invention and/or due to the arrangement of the antenna arrangement adjusted to the preparation area, can be changed and/or adjusted and/or optimized in performance in order to heat the at least one food product preferably such that losses in performance (e.g. through a non-uniform temperature distribution or a non-uniform energy supply, in particular in areas without cooking products) can be reduced. To that end, for example also an arrangement of the antenna arrangement particularly near to the preparation area is conceivable.

In particular, it can be possible that operating preferably according to the at least one operation mode includes controlling, in particular also regulating, of operational parameters for the antenna arrangement. These operational parameters are e.g. a performance and/or a frequency and/or a phase of for example an electric voltage signal with which the antenna arrangement, in particular the individual antennas are operated. The transmission device in particular includes at least a high-frequency signal transmitter and/or at least a magnetron, in particular for outputting the voltage signal to the at least one antenna.

Furthermore, it can be provided that the temperature zone distribution through the antenna arrangement can be generated as a dynamic temperature zone distribution so that the temperature zone distribution, in particular in the cooking chamber, in particular through the operation of the antenna arrangement, can be changed and/or can be adjusted to the food product at the preparation area or to further food products at respective preparation areas and/or can be adjusted to a predetermined temperature zone distribution, in particular for performance-optimized, preferably homogeneous, in particular internal heating of the respective food product. Of course, it is also conceivable that an inhomogeneous heating of the respective food product is generated in order to, for example, heat certain areas of the individual food product more than other areas of this food product. The heating and/or the temperature (zone) distribution can refer for example to a single food product, so that this means an internal heating or temperature distribution of the food product, and/or can refer to the heating of multiple food products in the cooking chamber. For example, the temperature zone distribution can thus also be adjusted to a certain dish and/or a certain way of preparation, in particular in a user-specific way.

It can optionally be possible that the antenna arrangement includes at least two antennas, which are arranged spaced from one another, and which are operable through the transmission device or in each case through individual transmission devices, wherein the antennas are differently configured, in particular have different orientations and/or are operable according to different operational modes and/or are configured according to different antenna structures, whereby the temperature zone distribution can be generated depending on the different configuration of the antennas. In particular the orientation and/or the operational mode of the respective antennas can here also be changeable and/or controllable and/or regulatable. In particular the operation, in particular the control, of the respective antennas can be effected through the at least one transmission device in such a way that the operation of a first antenna is effected depending on the operation of a second antenna so that a synergy effect of the antennas can be used. For example, interference effects or the like can be used to generate an adjusted temperature zone distribution and/or hotspots through the adjusted control of the antennas.

Preferably, it can be provided within the scope of the invention that the antenna arrangement comprises at least one first antenna and one second antenna which are arranged spaced from one another, and in particular which are configured according to different antenna structures, wherein in particular the antenna structures include one of the following structures:
- a dipole antenna, preferably in which a directional characteristic depends on a current distribution over a length of an electric conductor of the dipole antenna,
- a monopole antenna, in particular rod antenna, preferably in which a field distribution rotation-symmetric around a vertical axis of the monopole antenna is effected,
- a circularly polarized antenna which in particular is configured as a cross dipole and/or comprises an arrangement with two antenna parts which are arranged displaced by 90° and/or can be fed phase-shifted by 90° and/or are operable linearly polarized.

Preferably, the circularly polarized antenna can thereby generate a strongly homogeneous temperature distribution (temperature zone distribution), as the field distribution of the electromagnetic waves constantly changes and thus a strongly changing penetration of the cooking product (the food product) is produced. In particular interference patterns can be reduced thereby. In contrast, in particular dipole antennas can generate hotspots in the cooking product in a targeted manner due to their directional characteristic. Preferably, here the antenna arrangement can be configured and/or operated in such a way that interference patterns can be generated in a targeted manner or as well be, for example predominantly, avoided. Thereby, a significant energy saving is possible.

In particular, it can be provided that at least one circularly polarized antenna is provided for generating a temperature (zone) distribution as homogeneous as possible, in particular in the cooking chamber and/or in the cooking product and/or for generating a temperature distribution (hotspots) as concentrated as possible, in particular in the cooking chamber and/or in the cooking product, at least one dipole antenna is provided. Circularly polarized antennas generate a strongly homogeneous temperature distribution as the field distribution of the electromagnetic waves constantly changes and thus a strongly changing penetration of the cooking product can be produced and/or interference patterns are avoided. However, dipole antennas, due to the directional characteristic, can be used to generate hotspots in the cooking chamber and/or in the cooking product in a targeted manner.

In particular, the energy distribution or the temperature distribution is a temperature zone distribution.

It can be provided within the scope of the invention that the antenna or at least one of the antennas of the antenna arrangement is configured as a copper antenna and/or at least partially comprises copper or the like. In particular, the advantage here is that copper has an antibacterial effect so that a considerate and healthy preparation of the at least one food product can be enabled.

Preferably, it can be possible that the antenna arrangement is formed to be non-moveable, and thus does not comprise any moveable parts. Alternatively or additionally, it is conceivable that different temperature distributions, in particular in the cooking chamber and/or in the cooking product, are produced in that the antenna arrangement is being adjusted with respect to the performance and/or frequency and/or phase used for operation. As a result, even e.g. hotspots can be generated in different areas without having to move the antenna arrangement. This enables a very space-saving and compact construction of the antenna arrangement.

It is also conceivable that at least two different preparation areas are provided, and different antennas of the antenna arrangement are arranged, in particular oriented, and/or are operable in such a way that a different degree of energy can be fed to the different preparation areas, so that food products can be heated at the respective preparation areas in a controlled manner, in particular in each case uniformly or in a predetermined manner, in particular in a different manner. Preferably, the uniform or predetermined heating relates to the entire cooking chamber or the respective preparation areas or the respective cooking product (food). In other words, a uniform temperature zone distribution can extend over the entire cooking chamber or at least one of the preparation areas or over the individual cooking product in a uniform manner. As a matter of fact, the same applies to non-uniform (inhomogeneous) temperature zone distribution and/or likewise for a temperature zone distribution in a predetermined manner.

Furthermore, it is advantageous when the antenna arrangement comprises a plurality of antennas, so that a fine-granular temperature distribution can be effected by the antennas, wherein preferably at least 3 or at least 5 or at least 10 or at least 20 antennas are provided. The fine-granular temperature distribution, in particular temperature zone distribution, can in particular be effected in the area of the cooking chamber and/or of the cooking product and/or in the area of at least one of the preparation areas. Preferably, the antennas can be arranged next to one another and/or in a matrix structure, in particular in a base element, to that end. This enables an antenna arrangement, which can be simply and inexpensively be produced, for the generation of the fine granular temperature distribution, in order to be able to perform a uniform heating of the food products.

Furthermore, it can be provided that the system includes a ceiling element and a base element, in particular a base or an insertion element, wherein in particular the base element is arranged opposite the ceiling element, and preferably the cooking chamber is at least partially defined by the base element and the ceiling element, and wherein in particular the antenna assembly is arranged in the area of the base element, preferably below the base element, wherein in particular the base element is arranged between the antenna arrangement and the cooking chamber. In this case, in particular, the antenna arrangement, preferably at least one of the antennas of the antenna arrangement, is integrated in the base element. This provides the advantage that the distance between the antenna arrangement and the food product can be reduced. This enables a significant energy saving. Alternatively or additionally, it can thus be possible that at least one heating element in integrated in the base element and/or ceiling element.

Preferably, it can be possible that the base element is configured as an insertion element and/or as a receiving means for the food product, and in particular that it is displaceable and/or fastenable and/or guidable and/or insertable in the cooking chamber at different heights of the cooking chamber (e.g. at different intervals to the ceiling element and/or to the base of the system). Preferably, the cooking chamber is defined here by the ceiling element and the base, wherein the base element is arranged at a certain distance or spaced from the ceiling element and/or the base. This enables a particularly simple and cost-efficient configuration of the cooking chamber.

Preferably, it is provided that the base element is configured as the base of a baking oven or as a baking tray or the like, which serves for the insertion into the cooking chamber and/or for receiving the food product.

In particular, the base element is arranged below the ceiling element in the system according to the invention, wherein the indication of the direction "below" relates to the use or operating state of the system according to the invention. Accordingly, the base element is arranged closer to an installation face for the system according to the invention in the operating state of the system according to the invention (wherein the installation face e.g. relates to a floor e.g. in a kitchen and the like).

According to another advantage, it can be provided that the antenna arrangement has a lesser distance to the preparation area than a ceiling element of the system, wherein preferably the distance between the antenna arrangement and the preparation area is maximum 1 cm, or maximum 4 cm, or maximum 6 cm, or maximum 10 cm, and preferably the antenna arrangement as a first heating device has a lesser distance to the preparation area than further heating devices of the system, in particular so that reflections and/or scattering of the electromagnetic energy can be reduced due to the small distance until impinging the food product. As a matter of fact, it can also be possible that at least one of the further heating devices has a similarly small distance to the preparation area as the first heating device. Of course, further antenna arrangements can be provided as further heating devices.

According to a further option, it can be provided that a base element of the system is at least partially formed of a non-metal and/or is formed to be transmissive for the electromagnetic energy, in particular the electromagnetic radiation, preferably so that the electromagnetic energy can reach the cooking chamber through the base element, wherein preferably the base element mainly comprises ceramics and/or glass and/or is made thereof and/or at least partially or mainly is produced from a non-metal material. This provides the advantage that the energy consumption for the preparation can be reduced significantly.

Moreover, it is advantageous if a further heating device is provided besides the antenna arrangement, preferably in the area of a ceiling element of the system, wherein the further heating device includes at least one heating coil and/or electric heater and/or magnetron, which in particular is fastened to the ceiling element. In particular, temperature zones, in particular in the cooking chamber and/or in the cooking product, can be generated by the heating device and/or by the antenna arrangement in a very flexible and dynamic manner. Preferably, a uniform temperature distribution can be generated by an adjustment of the field distribution of the electromagnetic radiation radiated by the antenna arrangement. Of course, it can also be possible that the heating device is arranged in the base element so that a particularly efficient heating of the cooking product can be effected. In particular, a grill function can be realized by the further heating device in order to roast the food product. The further heating device can e.g. comprise an electric heating.

In particular, it can be possible that a field distribution of electromagnetic energy, in particular radiation, is being adjusted by the antenna arrangement in such a way that a temperature adjustment adjusted to the at least one food product is effected. In this way, e.g. different diverse food products can be present in particular in the cooking chamber, e.g. fish with side and vegetables and the like. These food products usually have differences with respect to the size and weight and the like, so that they heat-up at different speeds. Through the adjusted temperature distribution, a desired, e.g. adjusted and uniform, heating can be enabled. To that end, so-called hotspots can be used, which enable a locally restricted concentration of the temperature distribution.

It can be of further advantage that the system is formed as an oven, in particular a baking oven, or microwave or the like. In particular, in the microwave, it is conceivable that the microwave radiation is radiated by the antenna arrangement and/or by a magnetron.

The invention also relates to a method for the preparation of at least one food product, wherein the food product is positioned and/or prepared in a cooking chamber at at least one preparation area.

To that end, it is provided, in particular, that at least one of the following steps is provided for the preparation of the at least one food product, wherein, in particular, the steps can be performed one after the other or in any order, and preferably individual steps can also be performed repeatedly:
 a) Orienting at least one antenna of an antenna arrangement in dependence from the preparation oven
 b) Operation of the antenna according to at least an operation mode by a transmission device, so that electromagnetic energy is fed to the cooking chamber, whereby a performance-optimized temperature zone distribution, in particular in the cooking chamber, is generated for heating the food product.

As a result, the method according to the invention provides the same advantages as have been described in detail with respect to the system according to the invention. In addition, the method according to the invention can be suitable to operate a system according to the invention.

In another option, it can be provided that the electromagnetic energy is a high-frequency electromagnetic radiation in the microwave range and/or in a frequency range which is suitable for heating the food product. In particular, the electromagnetic energy is radiated into the cooking chamber as an electromagnetic wave. In particular, it can be provided that the radiation completely penetrates the food product cooking product. To that end, e.g. as a criterium for the selection of the frequency range, it can be assumed that the food product is or comprises water. This enables a simple and reliable operation of the antenna arrangement for the preparation of the food product.

Advantageously, it can be provided in the scope of the invention that at least two different preparation areas are provided, and different antennas of the antenna arrangement are arranged, in particular oriented and/or operated in such a way that a different degree of energy is fed to the different preparation areas, wherein the respective different degrees of energy are regulated depending on conditions specific to the food products at the respective preparation areas in such a way that the food products can be heated in accordance with a presetting, in particular in a uniform manner. For example, these conditions can be a size and/or a weight of the respective food product and/or a type of the respective food product, which e.g. can be different for different food products, so that the food products can heat-up at different speeds while supplying the same amount of energy. In particular, the presetting can be a predetermined temperature distribution and/or a predetermined cooking behavior and/or a desired cooking process. In particular, the presetting can be determined in that a user input is evaluated.

It can be provided in the scope of the invention that the operation of at least two antennas of the antenna device is effected with different operating modes, which are different from one another with respect to a performance and/or a frequency and/or a phase (i.e. the electromagnetic wave and/or electromagnetic voltage) and/or a cyclic switching-on and switching-off, by means of which the respective antennas of the antenna arrangement are operated, so that preferably a predetermined temperature zone distribution, in particular in the cooking chamber, is generated, preferably with a homogenous or inhomogeneous temperature distribution. In this case, the in-homogenous temperature distribution particularly serves to generate a hotspot, so that a particularly flexible preparation of the food products can be effected. In this case, the frequency in particular is the transmission frequency of the antennas and/or the frequency of the radiated performance of the respective antennas. In particular, switching-on and/or switching-off can be effected by a pulsed operation of the antennas, in particular by a pulse width modulation and/or phase modulation.

Furthermore, in the scope of the invention, it can be provided that the operation of the antenna arrangement is adjusted by a control unit, so that a predetermined temperature zone distribution, in particular in the cooking chamber and/or in the cooking product, is generated depending on conditions that are evaluated by the control unit. In particular, the conditions can include the settings and/or user input and/or measuring results. This allows a particularly energy-saving and efficient food product preparation.

Furthermore, it is conceivable that for the generation of a predetermined temperature zone distribution the energy supply for different preparation areas of the cooking chamber, in particular in the cooking chamber performed differently, so that
 at least two different temperature zones with in each case different temperature, in particular in the cooking chamber, are produced for different preparation areas, so that in particular food products at different preparation areas are non-uniformly heated, in particular according to a first, in particular inhomogeneous temperature zone distribution, or
 a single temperature zone for a homogeneous temperature distribution is produced, in particular in the cooking chamber and/or cooking product, so that in particular food products at different preparation areas are heated with substantially the same temperature, in particular according to a second, in particular homogeneous, temperature zone distribution.

In particular, the first temperature zone distribution can be used when a gentle heating is necessary depending on the type of the food product. Furthermore, it is conceivable that the different temperature zone distributions are used when a same finishing time is to be ensured e.g. despite different types of food. In this case, in particular the second temperature zone distribution is used when a same heating is to be effected in the same or different food products, in which the temperatures are allowed to be different in particular maximally in a certain range. In contrast, the in-homogenous temperature distribution is particularly suitable to generate hotspots.

Furthermore, it can be provided that a first target temperature value is provided for a temperature distribution for a first temperature zone of a first preparation area, and a second target temperature value is provided for a second temperature zone of a second preparation area, wherein the antenna arrangement is controlled by the at least one transmission device and/or control unit in such a way that the respective temperature zones can be regulated individually with respect to the respective target temperature value. In particular, a control by the transmission device and/or the control unit is effected in such a way that the temperature in the temperature zones, in particular despite different food products, corresponds to a certain target temperature value and/or that different target temperatures are predetermined e.g. depending on the food product.

According to another advantage, it can be provided that a target temperature value of at least one temperature zone is a predetermined temperature value of the food product, which is compared with a measured and/or estimated reference temperature value of the food product for regulating the temperature zones, so that the reference temperature value maximally has a predetermined deviation from the target temperature value in the preparation process. Statistical methods can be employed for estimating the reference temperature value, for example, so that a simple determination of the reference temperature value is possible.

According to another option, it can be provided that a first target temperature value of a first temperature zone for a first food product and/or at a first preparation area deviates (in particular for in-homogenous temperature zone distribution) or is identical (in particular for homogenous temperature zone distribution) from or to a second target temperature value for a second food product and/or at a second preparation area depending on a preset and/or a user input. Thus, the temperature zone distribution can be regulated in a simple manner.

Furthermore, it is conceivable that at least one drive is provided for the antenna arrangement and/or for the respective antennas. As a result, the antennas can be oriented in a simple manner.

Furthermore, it can be possible that the transmission device comprises at least one high-frequency signal transmitter and/or at least one performance amplifier, so that an electric signal can be output to the at least one antenna of the antenna arrangement to enable the operation of the at least one antenna.

Further advantages, features and details of the invention result from the following description, in which exemplary embodiments of the invention are described in detail with reference to the drawings. Incidentally, features mentioned in the claims and in the description can be essential to the invention either individually per se or in any combination. The Figures show in:

Hereinafter, identical reference characters will be given to the same technical features of different exemplary embodiments.

Figure 1:
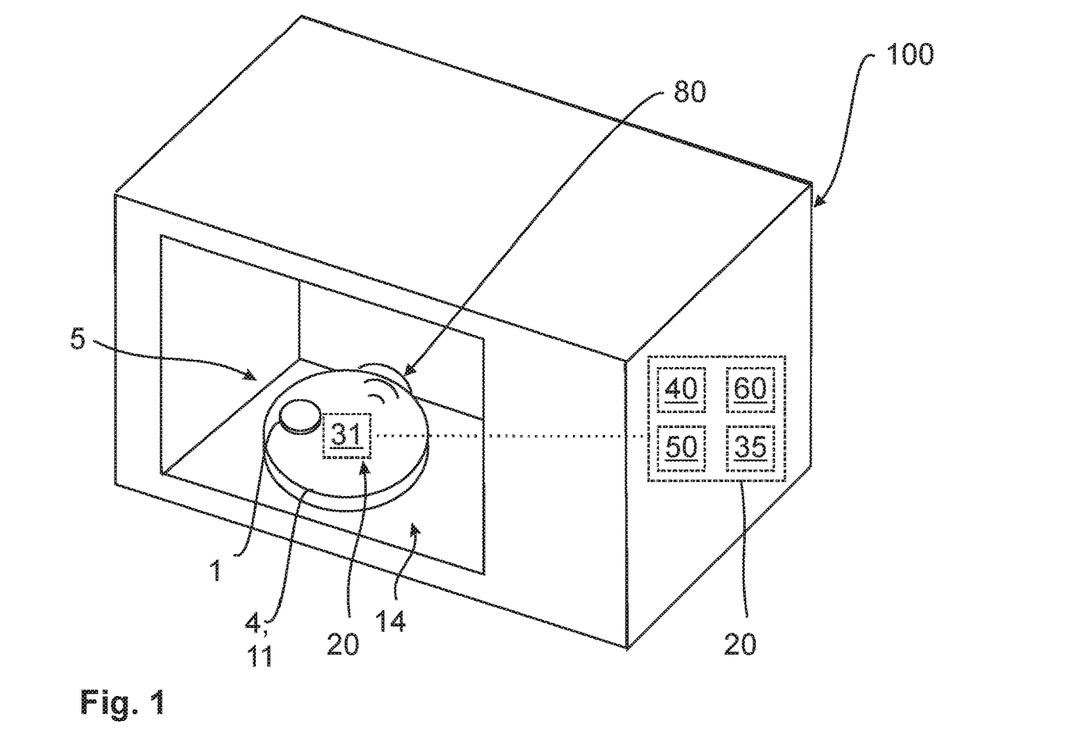
FIG. 1 a schematic illustration of parts of a system according to the invention, FIG. 2 a further schematic illustration of parts of a system according to the invention, FIG. 3 a further schematic illustration of parts of a system according to the invention, and FIG. 4 a further schematic illustration of parts of a system according to the invention.

FIGS. 1 to 4 each show schematically parts of a system 100 according to the invention. In FIG. 1, the parts of the system 100 according to the invention are parts of a microwave oven, and in FIGS. 2 to 4, the parts of the system 100 according to the invention are parts of a baking oven. Of course, these configurations are merely exemplary, so that further embodiments are conceivable for the system 100 according to the invention as well.

FIG. 1 shows that the system 100 according to the invention comprises a food carrier 4, so that a preparation area 5 can be provided for at least one food product 1. In this case, the food carrier 4 is configured as a base element 11. In this base element 11, a heating device 20 can be arranged, which comprises at least one antenna 31 and thus corresponds to an antenna arrangement 30. Alternatively or additionally, the antenna arrangement 30 and/or a further antenna 31 can be arranged in a base 14 as well. In this case, the antenna arrangement 30 serves for the energy transfer of electromagnetic energy 80 to the preparation area 5, whereby the food product 1 can be heated. To effect this, the heating device 20 or the antenna arrangement 30 also includes at least one drive 35 and/or at least one transmission device 40 and/or at least one performance amplifier 50 and/or at least one control unit 60.

Here, the drive 35 particularly serves to move and thus orient the respective antennas 31 of the antenna arrangement 30. The transmission device 40, in particular a high frequency signal transmitter, particularly serves to operate the respective antenna 31.

As can be taken from FIG. 1, the at least one antenna 31 of the antenna arrangement 30 is located very close to the food product 1, so that an energy loss can be prevented.

Figure 2:
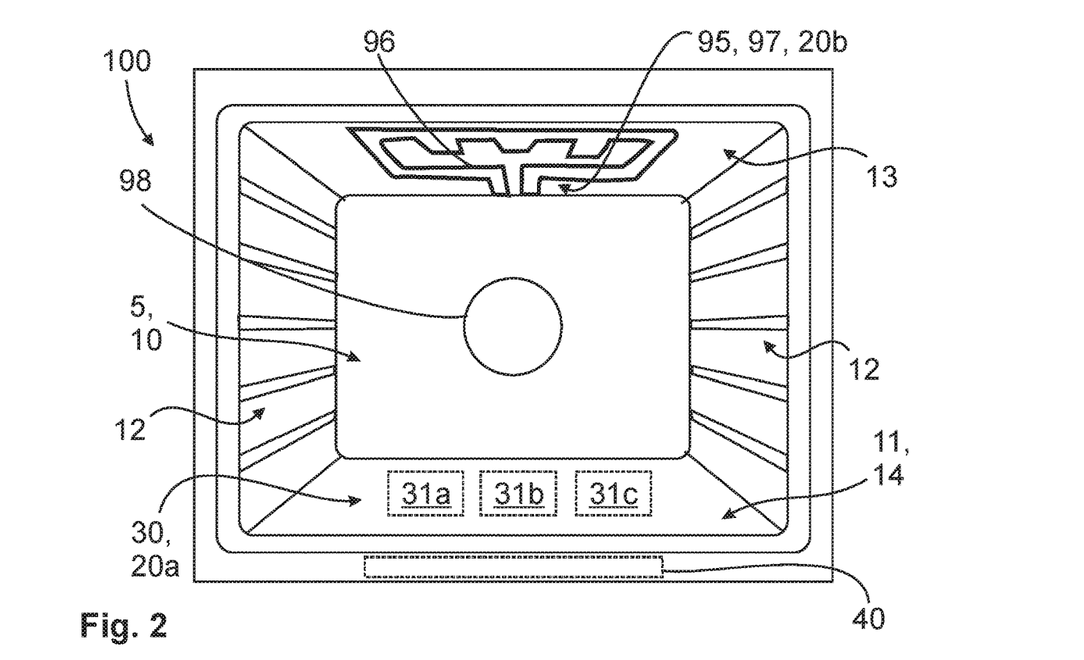

In FIG. 2, an antenna arrangement 30, i.e. at least a first antenna 31a and/or a second antenna 31b and/or a third antenna 31c, is arranged in a base element 11 or in a base 14, respectively, of a baking oven. Here, the first antenna 31a can be configured e.g. as a monopole antenna, the second antenna 31b can e.g. be configured as a dipole antenna and/or the third antenna can e.g. be configured as a circular polarized antenna. As a matter of fact, it is also conceivable that only one or multiple of the respective first and/or second and/or third antennas 31a, 31b, 31c are provided. In other words, the first and second and third antenna(s) 31a, 31b, and 31c are in each case optionally present, and in particular are in each case present individually or likewise in a bigger number. An arrangement distributed, e.g. in the type of a matrix, over the surface of the base element 11 and/or the base 14 of the antennas is conceivable as well. In addition, a transmission device 40 can be provided as well in order to operate the respective antennas 31.

Furthermore, FIG. 2 shows that the baking oven and/or the system 100 according to the invention comprises at least one side element 12 and/or the base element 11 and/or a ceiling element 13 and/or the base 14, which at least partially define and/or form in particular the cooking chamber 10. Optionally, a grill 95 and/or a heating coil 96 and/or a heating source 97 and/or a ventilator 98 can be provided. The grill 95 and/or the heat source 97 and/or the heating coil 96 can be configured as at least a second heating device 20b, wherein the antenna arrangement 30 forms the heating device 20a.

Figure 3:
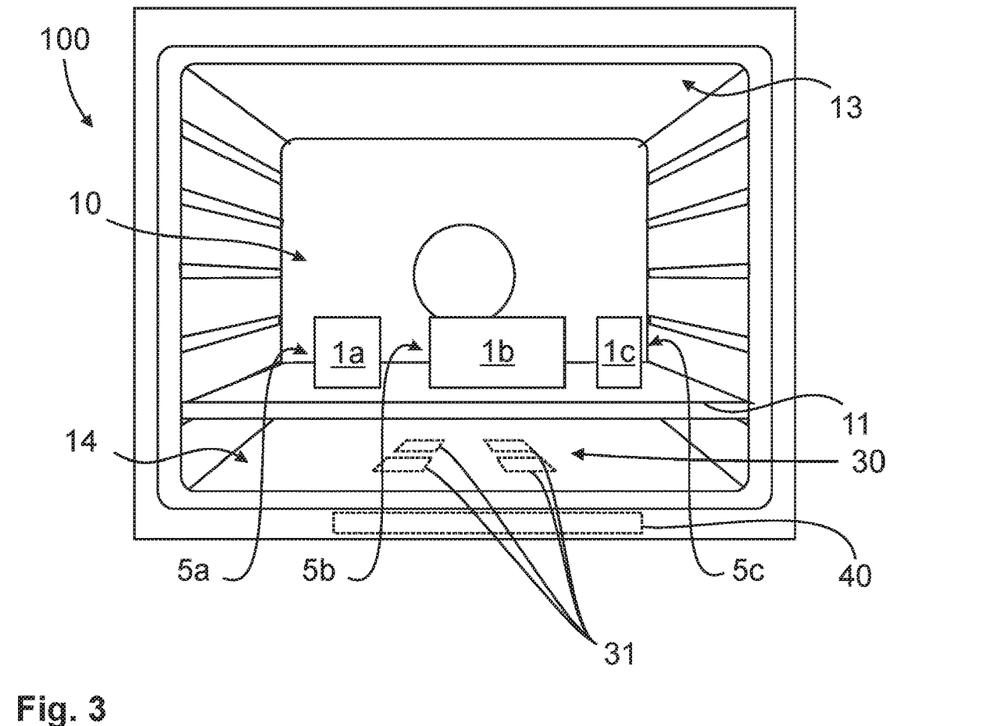
Figure 4:
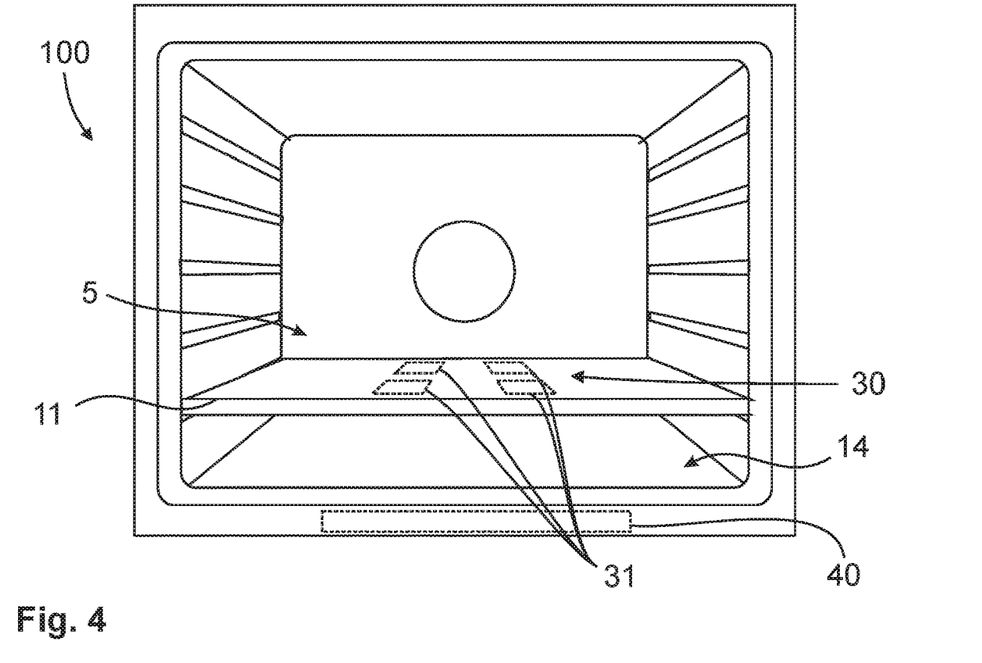

FIGS. 3 and 4 shows that even a base element 11 separate from the base 14 can be provided in order to receive at least one food product 1. By way of example, FIG. 3 shows a first food product 1a at a first preparation area 5a and a second food product 1b at a second preparation area 5b and a third food product 1c at a third preparation area 5c. Here, the antenna arrangement 30 can e.g. comprise at least one antenna 31, which is integrated in the base 14 (see FIG. 3) and/or in the base element 11 (see FIG. 4).

In this case, it is conceivable that the temperature zone distribution in the cooking chamber 10 is generated in such a way that the individual food products 1a, 1b, 1c are heated uniformly, or even hotspots are generated for the respective or for one of the food products 1. The hotspots e.g. allow that a specific food product 1 (e.g. only the second food product 1b) or even only a certain area of the individual food product 1 (e.g. the second food product 1b) are heated in a particularly intense fashion, i.e. the temperature distribution is concentrated in the area.

The generation of the temperature zone distribution and in particular the change of the temperature zone distribution can e.g. be possible in that the antenna arrangement 30 is operable in a modified manner and/or can be oriented in a modified manner. The modifiable orientation can e.g. be effected through at least one drive 35, which moves, in particular rotates, the at least one antenna 31. The modifiable operation, e.g. according to at least one operating mode, can e.g. be enabled in that the transmission device 40 activates the at least one antenna 31 with different electric signals and/or frequencies.

The above description of embodiments describes the present invention exclusively in the form of examples. As a matter of fact, individual features of the embodiments can be freely combined with one another, as far as is technically feasible, without abandoning the scope of the present invention.

LIST OF REFERENCE CHARACTERS

1 Food product
1a First food product
1b Second food product
1c Third food product
4 Food product carrier
5 Preparation area
5a First preparation area
5b Second preparation area
5c Third preparation area
10 Cooking chamber
11 Base element
12 Side element
13 Ceiling element
14 Base
20 Heating device
20a First heating device
20b Second heating device
30 Antenna arrangement
31 Antenna
31a First antenna, monopole antenna
31b Second antenna, dipole antenna
31c Third antenna, circularly polarized antenna
35 Drive
40 Transmission device, higher frequency signal transmitter
50 Performance amplifier
60 Control unit
80 Electromagnetic energy or radiation
95 Grill
96 Heating coils
97 Heating source
98 Ventilator
100 System

The invention claimed is:

1. A system for preparing at least one food product, comprising:
a cooking chamber in which at least one preparation area is provided, wherein the at least one food product is preparable at the at least one preparation area,
at least one antenna for energy supply of electromagnetic energy into the cooking chamber, whereby the at least one food product is heated for preparation, and
at least one transmitter for operating the antenna,
wherein at least one antenna is oriented depending on the at least one preparation area and is operable by the transmitter according to at least one operation mode, so that a performance-optimized temperature zone distribution is generated for heating the food product,
wherein the operation of at least two antennas is effected with different operation modes which differ with at least regard to a power or a frequency or a cyclic switching-on and switching-off with which the respective antennas are operated, so that a predetermined temperature zone distribution is generated, and
wherein
the system comprises at least one first antenna and one second antenna, which are arranged spaced from one another, wherein the respective antenna is configured as at least one of the following antenna structures:
as a dipole antenna in which a directional characteristic depends on a current distribution over a length of an electric conductor of the dipole antenna,
as a monopole antenna in which a rotation-symmetric field distribution occurs about a vertical axis of the monopole antenna, or
as a circularly polarized antenna.

2. The system according to claim 1, wherein
the temperature zone distribution is generated as a dynamic temperature zone distribution by the antenna, so that the temperature zone distribution
is at least amendable or
is adaptable to the at least one food product at the preparation area, or
is adaptable to a predetermined temperature zone distribution.

3. The system according to claim 1, wherein
the system comprises at least two antennas which are arranged spaced from one another, and which are operable through the transmitter or in each case through individual transmitters, wherein the antennas are differently configured, whereby the temperature zone distribution is generated depending on the different configuration of the antennas.

4. The system according to claim 1, wherein
the at least one antenna is configured as copper antenna.

5. The system according to claim 1, wherein
at least two different preparation areas are provided in the cooking chamber, and different antennas are at least arranged or are operable in such a way that a different degree of energy is supplied to the different preparation areas so that food products are heated in a controlled manner at the respective preparation areas.

6. The system according to claim 1, wherein
the system comprises a plurality of antennas, so that a fine-granular temperature distribution is produced by the antennas, wherein at least 3 antennas are provided.

7. The system according to claim 1, wherein
the system comprises a ceiling element and a base element, wherein the base element is arranged opposite the ceiling element, and the cooking chamber is at least partially defined through the base element and the ceiling element, and wherein the antenna is arranged in the area of the base element below the base element, wherein the base element is arranged between the antenna and the cooking chamber.

8. The system according to claim 1, wherein
the antenna has a lesser distance to the preparation area than a ceiling element of the system, wherein the distance between the antenna and the preparation area is maximum 1 cm or maximum 4 cm or maximum 6 cm or maximum 10 cm, and the antenna as a first heating device has a lesser distance to the preparation area than further heating devices of the system.

9. The system according to claim 1, wherein
a base element of the system is at least partially formed of a non-metal,
or is configured penetrable for the electromagnetic energy, so that the electromagnetic energy reaches the cooking chamber through the base element starting from the antenna arrangement, wherein the base element mainly comprises at least ceramic or glass or is made thereof.

10. The system according to claim 1, wherein
a further heating device is provided besides the antenna in the area of a ceiling element of the system, wherein the further heating device comprises at least one heating coil or electric heater.

11. The system according to claim 1, wherein
the system is configured as an oven or microwave.

12. A method for preparing at least one food product, wherein the at least one food product is prepared in a cooking chamber at at least one preparation area,
wherein for the preparation of the at least one food product, at least the following steps are provided:
a) Aligning at least one antenna depending on the at least one preparation area, and
b) Operating the antenna according to at least one operation mode through at least one transmitter, so that electromagnetic energy is supplied into the cooking chamber, whereby a performance-optimized temperature zone distribution is generated for heating the food product,
wherein the operation of at least two antennas is effected with different operation modes which differ with at least regard to a power or a frequency or a cyclic switching-on and switching-off with which the respective antennas are operated, so that a predetermined temperature zone distribution is generated, and wherein
the at least two antennas comprise at least one first antenna and one second antenna, which are arranged spaced from one another, wherein the respective antenna is configured as at least one of the following antenna structures:
as a dipole antenna in which a directional characteristic depends on a current distribution over a length of an electric conductor of the dipole antenna,
as a monopole antenna in which a rotation-symmetric field distribution occurs about a vertical axis of the monopole antenna, or
as a circularly polarized antenna.

13. The method according to claim 12, wherein
the electromagnetic energy is a high-frequency electromagnetic radiation at least in the microwave range or in a frequency range which is suitable for heating food products.

14. The method according to claim 12, wherein
at least two different preparation areas are provided, and different antennas are at least arranged or operated such that in each case a different degree of energy is supplied to the different preparation areas, wherein the respective different degrees of energy are controlled depending on conditions which are specific for the food products at the respective preparation area in such a way that the food products are heated according to a presetting.

15. The method according to claim 12, wherein
the operation of the antenna is adjusted through a controller so that a predetermined temperature zone distribution is generated depending on conditions which are evaluated through the controller.

16. The method according to claim 12, wherein
for the generation of a predetermined temperature zone distribution, the energy supply for different preparation areas of the cooking chamber is differently performed, so that
at least two different temperature zones with different temperatures are effected in the cooking chamber for different preparation areas, or
a single temperature zone for a homogeneous temperature distribution in the cooking chamber is effected.

17. The method according to claim 12, wherein
for the generation of a predetermined temperature zone distribution, a first target temperature value is provided for a first temperature zone of a first preparation area, and a second target temperature value is provided for a second temperature zone of a second preparation area, wherein the antenna is controlled through the at least one transmitter or controller in such a way that the respective temperature zones are controlled individually with respect to the respective target temperature value.

18. The method according to claim 12, wherein
a target temperature value of at least one temperature zone is a predetermined temperature value for the food product, which is compared to at least a measured or estimated reference temperature value of the food product for controlling the at least one temperature zone, so that, in the preparation, the reference temperature value has maximally a predetermined deviation from the target temperature value.

19. The method according to claim 12, wherein
a first target temperature value of a first temperature zone for a first food product deviates from or is identical with a second target temperature value of a second temperature zone for a second food product depending on at least a presetting or an operator input.

20. A system for preparing at least one food product, comprising:
- a cooking chamber in which at least one preparation area is provided, wherein the at least one food product is preparable at the at least one preparation area,
- at least one antenna for energy supply of electromagnetic energy into the cooking chamber, whereby the at least one food product is heated for preparation, and
- at least one transmitter for operating the antenna,
- wherein at least one antenna orientation is modified depending on the at least one preparation area and wherein at least one antenna is operable by the transmitter according to at least one operation mode, so that a performance-optimized temperature zone distribution is generated for heating the food product,
- wherein the operation of at least two antennas is effected with different operation modes which differ with at least regard to a power or a frequency or a cyclic switching-on and switching-off with which the respective antennas are operated, so that a predetermined temperature zone distribution is generated, and
- wherein
- the system comprises at least one first antenna and one second antenna, which are arranged spaced from one another, wherein the respective antenna is configured as at least one of the following antenna structures:
- as a dipole antenna in which a directional characteristic depends on a current distribution over a length of an electric conductor of the dipole antenna,
- as a monopole antenna in which a rotation-symmetric field distribution occurs about a vertical axis of the monopole antenna, or
- as a circularly polarized antenna.

21. The system according to claim 1, wherein the orientation of the antenna depending on the preparation area is achieved by fixing and aligning the antenna in such a way that radiation of the electromagnetic energy by the antenna is in a specific direction.

* * * * *